US008824871B2

(12) United States Patent  
Togashi et al.

(10) Patent No.: US 8,824,871 B2  
(45) Date of Patent: Sep. 2, 2014

(54) MOVING PICTURE PLAYBACK EQUIPMENT AND MOVING PICTURE PLAYBACK METHOD

(75) Inventors: Yuichi Togashi, Tokyo (JP); Yoshihiro Katayama, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2023 days.

(21) Appl. No.: 11/643,914

(22) Filed: Dec. 22, 2006

(65) Prior Publication Data

US 2007/0147786 A1 Jun. 28, 2007

(30) Foreign Application Priority Data

Dec. 27, 2005 (JP) ................................. 2005-374602

(51) Int. Cl.  
*H04N 5/89* (2006.01)  
*G11B 27/32* (2006.01)  
*G11B 27/10* (2006.01)

(52) U.S. Cl.  
CPC ...... *G11B 27/105* (2013.01); *G11B 2220/2579* (2013.01); *G11B 27/32* (2013.01); *G11B 2220/2562* (2013.01)  
USPC ........................................................ 386/336

(58) Field of Classification Search  
CPC .................. H04N 21/2343; H04N 21/234309; H04N 21/233  
See application file for complete search history.

(56) References Cited

U.S. PATENT DOCUMENTS 6,493,506 B1 * 12/2002 Schoner et al. ............... 386/126  
2004/0120228 A1 * 6/2004 Han .............................. 369/30.25  
2006/0034590 A1 * 2/2006 Teramoto ....................... 386/95  
2006/0127051 A1 * 6/2006 Tsumagari et al. ............ 386/95  
2006/0161944 A1 * 7/2006 Edwards ....................... 720/725

FOREIGN PATENT DOCUMENTS

JP 2005-182959 7/2005  
WO WO 2005/067293 7/2005

OTHER PUBLICATIONS

Notice of Reasons for Rejection mailed Aug. 24, 2010, from the Japanese Patent Office for Japanese Patent Application No. 2005-374602 (3 pages).

* cited by examiner

*Primary Examiner* — Huy T Nguyen  
(74) *Attorney, Agent, or Firm* — Finnegan, Henderson, Farabow, Garrett & Dunner, LLP

(57) ABSTRACT

According to one embodiment of the present invention, a moving picture playback equipment includes a disk drive section which reads out video information containing voice streams, subtitle streams and menu information items of a plurality of languages and management information thereof, a decode stream setting information management section, a decode stream setting information management table which stores setting information set by the decode stream setting information management section, and a separating section which extracts a stream of a language set under control of the decode stream setting information management section, wherein the decode stream setting information management section includes means for making playback settings of disks of plural types of formats by use of setting information recorded in the decode stream setting information management table.

6 Claims, 6 Drawing Sheets

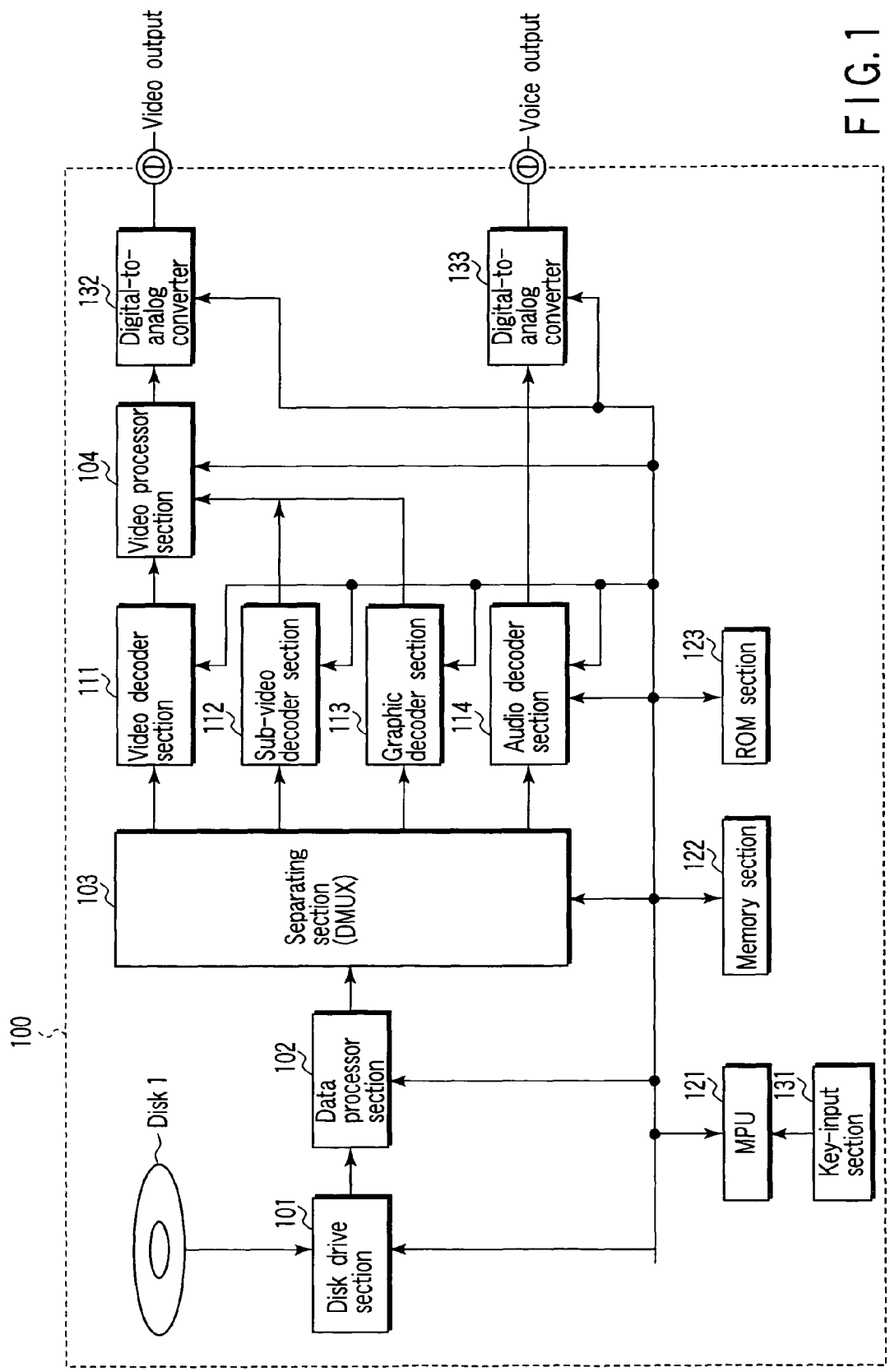
F I G. 1

MOVING PICTURE PLAYBACK EQUIPMENT AND MOVING PICTURE PLAYBACK METHOD

CROSS-REFERENCE TO RELATED APPLICATIONS

This application is based upon and claims the benefit of priority from Japanese Patent Application No. 2005-374602, filed Dec. 27, 2005, the entire contents of which are incorporated herein by reference.

BACKGROUND

1. Field

One embodiment of the invention relates to moving picture playback equipment and a moving picture playback method and more particularly to the improvement of a method for managing set information of the equipment when information is played back from recording media which are designed according to a plurality of standards and on which the contents of a plurality of streams are recorded.

2. Description of the Related Art

As present optical disks, a CD-series optical disk and Digital Versatile Disk (DVD)-series optical disk with respect to which data is recorded and played back by use of a red laser are provided. In recent years, a High-Definition Digital Versatile Disk (HD DVD) with respect to which data has been recorded and played back by use of a blue laser is put to practical use. Therefore, drive devices which determine types of various optical disks of different standards and realize compatible playback and compatible recording functions are actively being developed.

The DVD has large capacity, and multi-language audio, menu and subtitle data items are contained in recording data in some cases. What type of language data among the plural types of languages is decoded is determined by selecting and setting the stream with respect to the player by the user. However, the above setting operation is performed by operating the player each time a disk is loaded in the player. Therefore, the setting operation is troublesome.

Therefore, there is provided playback equipment which can automatically make a setting when a disk is loaded by previously storing a simple setting in the playback equipment by the user (refer to Jpn. Pat. Appln. KOKAI Publication No. 2005-182959 as a document).

However, in this document, it is disclosed that a disk to which the stream selecting and setting operation is performed is only a disk of a single format. Further, in this document, there is no description about a case wherein a plurality of formats are used. Therefore, when a disk of a format other than the set format is loaded in the player, there occurs a problem that it is necessary to perform the initialization process for a language stream or the like each time the disk is loaded.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary block diagram showing the configuration of moving picture playback equipment according to one embodiment of this invention.

DETAILED DESCRIPTION

Figure 2:
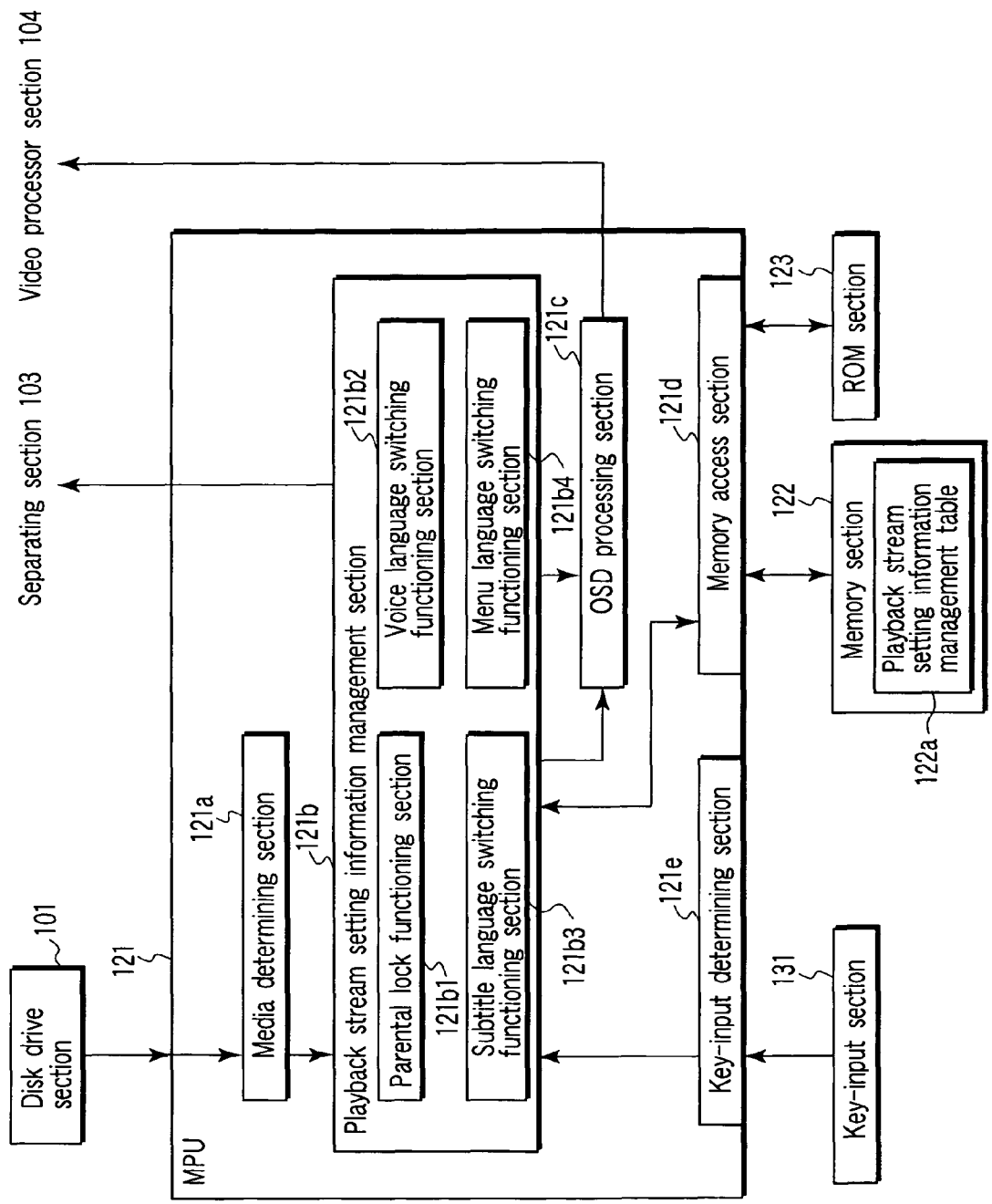
FIG. 2 is a block diagram showing one example of a functioning section contained in an MPU of the moving picture playback equipment shown in FIG. 1.

Various embodiments according to the invention will be described hereinafter with reference to the accompanying drawings.

An object of this invention is to provide moving picture playback equipment and a moving picture playback method which can automatically perform the stream selection initial setting process for plural types of disks by using a single set file when plural types of disks of different formats having a plurality of language streams are dealt with as will be described in the following embodiments.

In order to achieve the above object, a moving picture playback equipment and moving picture playback method in one embodiment of this invention include a disk drive section 101 which reads out video information containing voice streams of a plurality of languages, subtitles streams of a plurality of languages and menu information items of a plurality of languages and management information thereof, a separating section 103 which separates and extracts a desired stream among the video information output from the disk drive section, a decode stream setting information management table 122a which stores stream setting information used to set the separated stream, and a decode stream setting information management section 121b which controls the separating section 103 and automatically performs a playback and setting operation of disks with plural types of standards by using the stream setting information recorded in the decode stream setting information management table 122a.

By use of the above means, even when disks of plural types of standards are exchanged, the user can automatically select and play back a language stream which meets the taste of the user if the user sets the decode stream only once.

Next, the moving picture playback equipment and moving picture playback method according to one embodiment of this invention are explained with reference to the accompanying drawings. FIG. 1 is an exemplary block diagram showing the configuration of a moving picture playback equipment 100 according to one embodiment of this invention.

<Configuration and Function>

In FIG. 1, a reference symbol 1 denotes a recording medium (optical disk) which is loaded on a disk drive section 101 and from which information thereof is read out. A data processor section 102 is connected to the output portion of the disk drive section 101. A separating section 103 which is a demultiplexer (DMUX) is connected to the output portion of the data processor section 102.

The disk 1 is an optical disk on which video information (a video object which generally indicates video data, sub-video [sub-picture] data, voice data) and management information are recorded. A plurality of language streams are contained in the sub-video data and voice data. Further, in the video information, a portion thereof configures a plurality of streams and one of them can be selected. Therefore, parental lock information used to limit part of the streams of the video information is contained in the management information in some cases.

The disk drive section 101 reads out video information recorded on the disk 1 and management information relating to the video information. The data processor section 102 demodulates information read out by the disk drive section 101 and subjects the demodulated information to an error correction process. Further, information thus subjected to the error correction process is temporarily stored in a track buffer in the data processor section 102.

The separating section 103 extracts information stored in the track buffer, separates the same into a video pack, graphic unit pack, audio pack and sub-video pack and outputs the packs to a succeeding-stage circuit. A pack string supplied to the separating section 103 contains streams of voice data, sub-video data (such as subtitles) and menus of a plurality of languages. Pack strings (streams) separately output are specified by a control signal from the MPU 121.

A video decoder section 111, sub-video decoder 112, graphic decoder section 113 and audio decoder section 114 are connected to the output portion of the separating section 103. The output terminals of the video decoder section 111, sub-video decoder 112 and graphic decoder section 113 are connected to a video processor 104. The output terminal of the video processor section 104 is connected to a digital-to-analog converter 132. The output terminal of the digital-to-analog converter 132 is connected to a display device (not shown) which is connected to the moving picture playback equipment 100. Further, the output terminal of the audio decoder section 114 is connected to a digital-to-analog converter 133. The output terminal of the digital-to-analog converter 133 is connected to a speaker (not shown).

The video decoder section 111 decodes a video pack. The sub-video decoder 112 decodes a sub-video pack. The graphic decoder section 113 decodes a graphic unit pack and the audio decoder section 114 decodes an audio pack. The video processor section 104 adjusts and multiplexes decoded video information. The digital-to-analog converters 132, 133 convert video information and audio information which are digital information into an analog form.

Further, the respective sections of the moving picture playback equipment 100 are connected to a microprocessor unit (MPU) 121 via a bus. The MPU 121 is connected to a key-input section 131. Further, the MPU 121 is connected to a memory section 122 and ROM section 123 via a bus.

The MPU 121 generally controls the respective blocks of the moving picture playback equipment 100. In the memory section 122, management information relating to video information is stored. In the ROM section 123, software or the like used to operate the moving picture playback equipment 100 is stored. The key-input section 131 is used to convert an operation input from the exterior to a control signal.

Each decoder is shown as one unit, but in practice, decoders (player sections) which are operated to cope with various standards (such as DVD, HD DVD) are prepared. Then, a video, audio and sub-video processing section is operated according to a disk with a standard to be played back.

<Operation>

When a disk 1 is loaded on the disk drive section 101, the disk drive section 101 rotates and drives the disk 1 loaded thereon and reads out information stored in the disk 1 by use of an optical pickup (not shown).

Video information read out by the disk drive section 101 is subjected to the demodulation and error correction process in the data processor section 102 and then stored into the track buffer in the data processor section 102. Management information relating to the video information among the information stored in the track buffer is recorded in the memory section 122 and used for playback control, data management and the like. Video information stored in the track buffer is supplied to the separating section 103 and separated into a video pack, graphic unit pack, audio pack, sub-video pack and the like.

The thus separated video pack, sub-video pack, graphic unit pack and audio pack are respectively supplied to the video decoder section 111, sub-video decoder section 112, graphic decoder section 113 and audio decoder section 114 and subjected to the corresponding decoding processes. For the packs supplied to the respective decoders at this time, streams of voices, subtitles and menus of desired languages of the user are selected.

The decoded video pack, sub-video pack and graphic unit pack are supplied to the video processor 104 and subjected to multiple processing. Video information subjected to the multiple processing is supplied to the digital-to-analog converter 132 and converted into a video analog signal which can be displayed on the display section. The video analog signal is supplied to the display section and the video signal is displayed thereon.

The decoded audio pack is supplied to the digital-to-analog converter 133 and converted into a voice analog signal which can be played back by use of a speaker. The voice analog signal is supplied to the speaker and the voice is played back.

FIG. 2 is a block diagram showing one example of a functioning section contained in the MPU 121 shown in FIG. 1 and is particularly related to this invention. The MPU 121 has a media determining section 121a. The media determining section 121a determines the type of a disk 1 loaded on the disk drive section 101. As a determining method for determining the type of a disk, various methods are provided. For example, there is provided a method for reading information in a burst cutting area and determining the type of a disk based on disk identification information described therein. Further, it is possible to estimate a disk based on a combination of a level of a focus error signal at the focus searching time and the laser beam wavelength of the optical pickup used.

When a first light source is used in the optical pickup device, the wavelength is set at 650 nm and NA is set at 0.65, then the following state is attained. When the focus error signal is set at "0", the just focus state is attained. In this state, if the objective lens is moved back and forth (moved in a thickness direction of the disk), the characteristic showing an "S"-shaped curve is provided. At this time, the maximum value MAX exceeds a threshold value Th1 when the disk is a DVD or HD DVD. When the disk is a CD, it does not exceed the threshold value Th1.

Further, when a second light source is used in the optical pickup device, the wavelength is set at 405 nm and NA is set at 0.65, then the following state is attained. The maximum value MAX of an "S"-shaped curve exceeds a threshold value Th2 when the disk is a DVD or HD DVD. When the disk is a CD, it does not exceed the threshold value Th1.

Thus, it is possible to determine that the disk is a DVD or HD DVD, or CD or another disk. If it is determined that the disk is a DVD or HD DVD, whether the disk is a DVD or HD DVD can be determined by determining a tracking error signal. For example, if the first light source (wavelength 650 nm) is used and NA is set at 0.65, the tracking error signal is converged when the disk is a DVD. On the other hand, if the second light source (wavelength 405 nm) is used and NA is set at 0.65, the tracking error signal is converged when the disk is an HD DVD. By using this phenomenon, whether the disk is a DVD or HD DVD can be determined.

The MPU 121 has a decode stream setting information management section 121b. The decode stream setting information management section 121b forms a decode stream setting information management table 122a in the memory section 122 by use of a memory access section 121d.

Various setting information items in which voice language streams, subtitles language streams, menu language streams and the on/off states of the parental lock which are commonly used for disks 1 of various types of formats at the playback time are set are recorded in the decode stream setting information management table 122a. The parental lock indicates visible and audible limits of video information.

The decode stream setting information management section 121b includes a parental lock functioning section 121b1, voice language switching functioning section 121b2, subtitle language switching functioning section 121b3 and menu language switching functioning section 121b4. The above functioning sections are used to control the separating section 103 to extract a desired stream of the user based on the decode stream setting information management table 122a. That is, when the parental lock functioning section 121b1 detects that parental lock information is set in the on state based on management information attached to the chapter of the disk 1, it controls the track buffer and separating section 103 to skip a corresponding chapter and play back a next chapter.

The voice language switching functioning section 121b2 controls the separating section 103 to play back a voice stream of a desired language of the user among the voice streams of a plurality of languages contained in the disk 1. The subtitle language switching functioning section 121b3 controls the separating section 103 to display a subtitle stream of a desired language of the user among the subtitles streams of a plurality of languages contained in the disk 1. The menu language switching functioning section 121b4 controls the separating section 103 to display menu information of a desired language of the user among menu information items of a plurality of languages contained in the disk 1. Decode stream setting information set by the above language switching functioning sections is recorded in the decode stream setting information management table 122a.

Further, the MPU 121 has an on-screen display (OSD) processing section 121c. The OSD processing section 121c displays the subtitles and menu by use of desired languages of the user under the control of the subtitles language switching functioning section 121b3 and menu language switching functioning section 121b4. When information is set in the decode stream setting information management table 122a, it displays a set menu.

Further, the MPU 121 has a key-input determining section 121e. The key-input determining section 121e controls various sections to reflect operations input to the key-input section 131 on the respective sections. It also performs the control operation to write a playback setting input into the decode stream setting information management table 122a.

This invention is not limited to the above embodiment. As the setting information recorded in the decode stream setting information management table 122a, various setting information items of voice language streams, subtitles language streams and menu language streams and on/off information of the parental lock are used. However, different setting information can be added or some of the information items can be selectively omitted.

Figure 3:
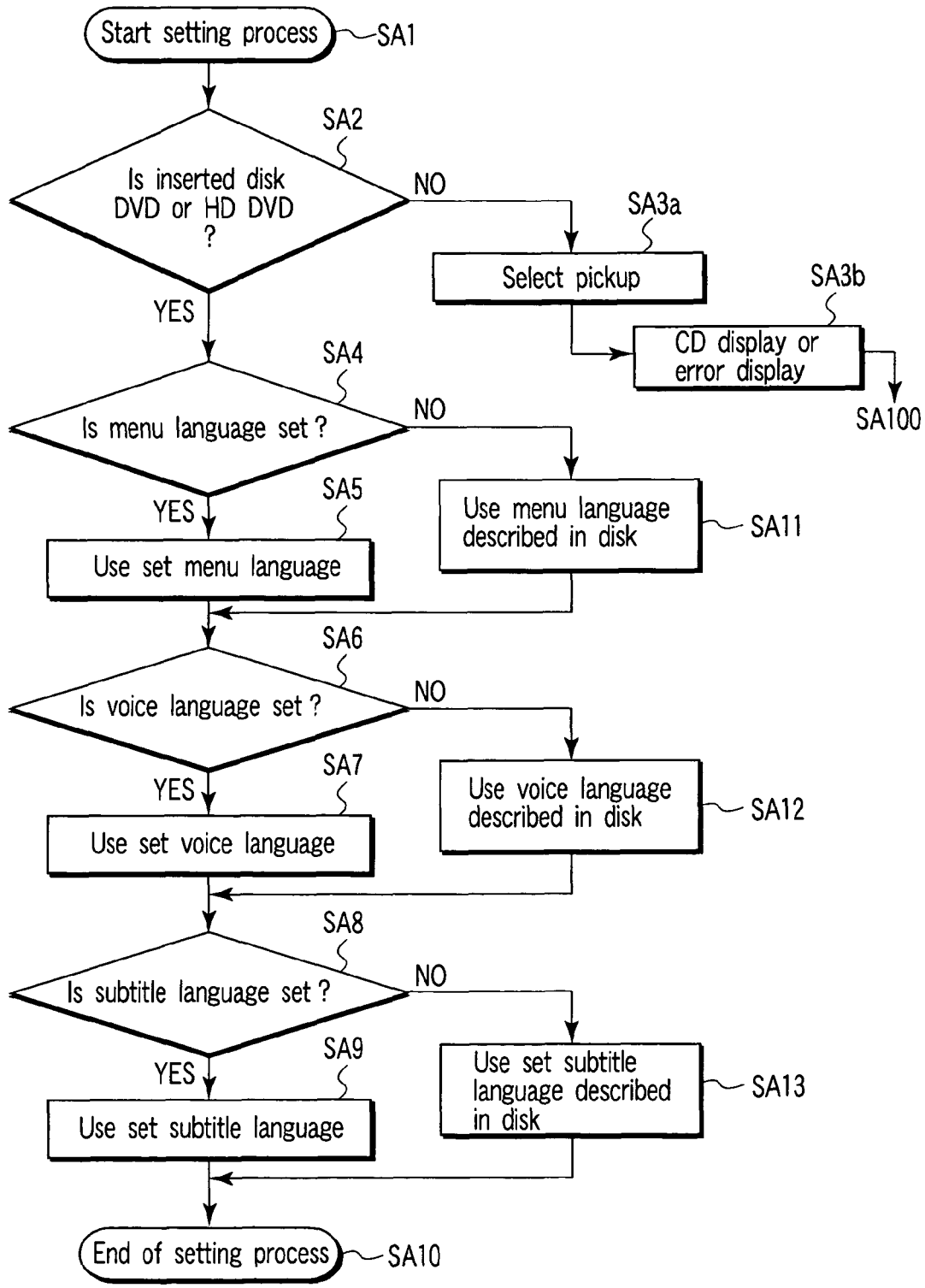
FIG. 3 is a flowchart showing one example of an automatic language setting process when the playback operation is performed.

FIG. 3 is a flowchart showing one example of an automatic language stream setting process when the disk is played back by use of the playback equipment. When the disk is loaded on the disk drive section 101 (step SA1), whether the loaded disk 1 is one of DVD and HD DVD or another disk (CD or unknown disk) is determined (step SA2). If it is neither DVD nor HD DVD, a CD pickup which is an optical system is selected (step SA3a). Then, if the disk is a CD, the operation of displaying that the disk is a CD on the display section is performed and the process is terminated. When the disk is an unknown disk, the operation of displaying an error on the display section is performed and the process is terminated.

When it is detected that the loaded disk 1 is a DVD or HD DVD, the decode stream setting information management section 121b searches the decode stream setting information management table 122a and determines whether or not a menu language is set in the decode stream setting information management table 122a (step SA4). If the menu language is set, the menu language switching functioning section 121b4 controls the separating section 103 to extract a menu stream of the set language (step SA5).

Next, whether or not a voice language is set in the decode stream setting information management table 122a is determined (step SA6). If the voice language is set, the voice language switching functioning section 121b2 controls the separating section 103 to extract a voice stream of the set language (step SA7). Next, whether or not a subtitles language is set in the decode stream setting information management table 122a is determined (step SA8). If the subtitles language is set, the subtitles language switching functioning section 121b3 controls the separating section 103 to extract a subtitle stream of the set language (step SA9). When the above setting operations are terminated, the setting process is terminated and the playback process is started (step SA10).

In this case, if the languages used in steps SA4, SA6, SA8 are not set in the decode stream setting information management table 122a, language streams of defaults described in management information of the respective disks are used (steps SA11, SA12, SA13).

This invention is not limited to the above embodiment. For example, the order of the flow of steps SA4 to SA9 may be changed. Further, different setting information can be added or some of the information items can be selectively omitted.

Figure 4:
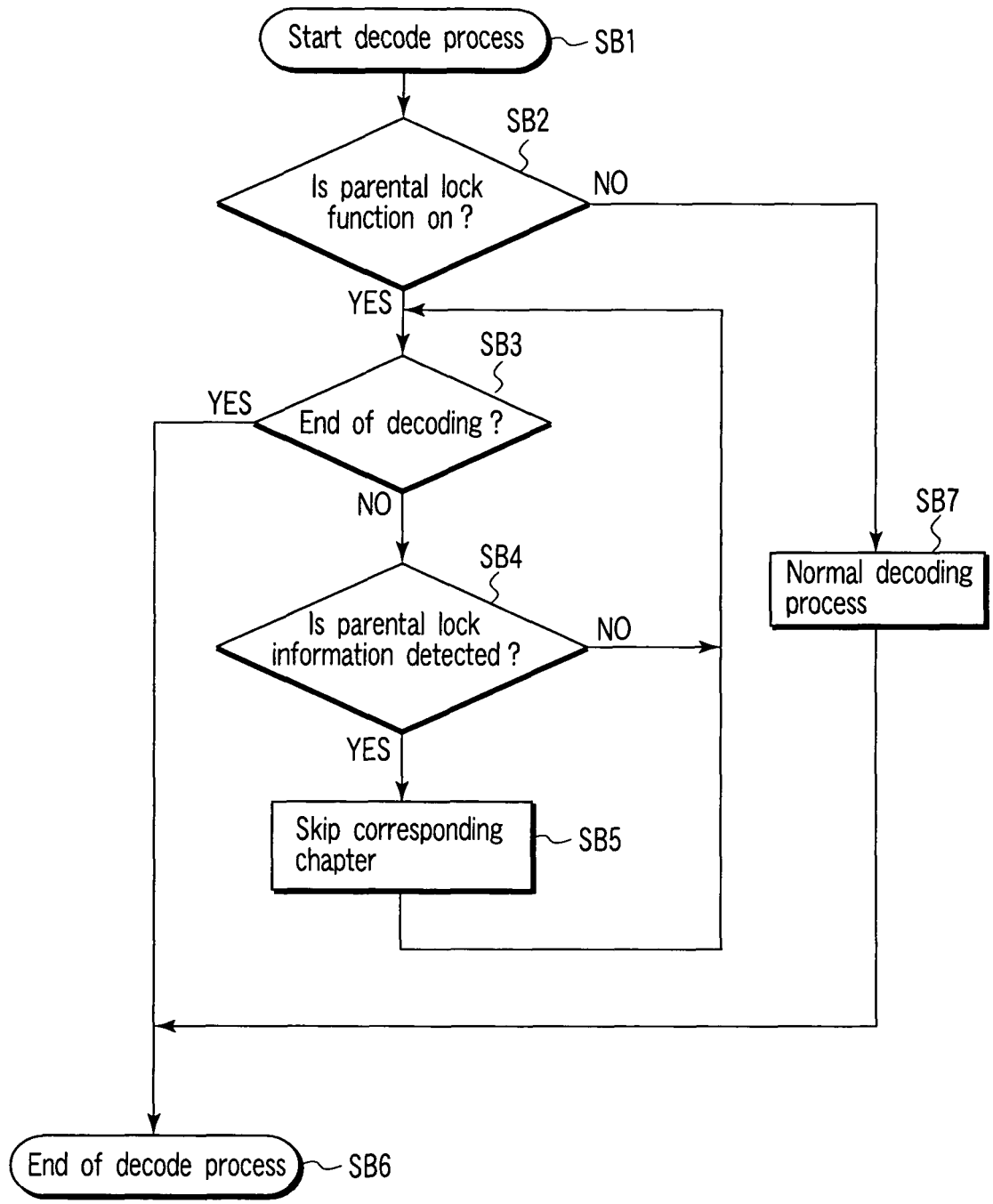
FIG. 4 is a flowchart showing one example of a process performed in a parental lock functioning section when the playback operation is performed.

FIG. 4 is a flowchart showing one example of a process performed in the parental lock functioning section 121b1 when the playback operation is performed. When the playback operation is started (step SB1), whether or not information indicating that the parental lock is set in the on state is recorded in the decode stream setting information management table 122a (step SB2).

Whether the playback operation is terminated or not is determined (step SB3). When the playback operation is terminated, the process is terminated (step SB6). If the playback operation is continuously performed, whether or not parental lock information is contained in the management information attached to the chapter of the disk 1 is determined (step SB4). If the parental lock information is not contained, the corresponding chapter is normally played back and the process returns to step SB3. If it is detected in the step SB4 that the parental lock information is contained, the corresponding chapter is not played back and is skipped, the process is performed for a next chapter (step SB5) and then returns to step SB3.

In step SB2, if the parental lock is set in the off state, the whole data of the disk 1, default or a stream with the high priority order is normally played back (step SB7).

In this example, a case wherein the chapter is skipped according to parental lock information attached to the chapter is explained, but this is not limitative. When the parental lock is set on and parental lock information is contained in management information attached to the whole data of the disk 1, it is possible not to play back the disk 1.

Figure 5:
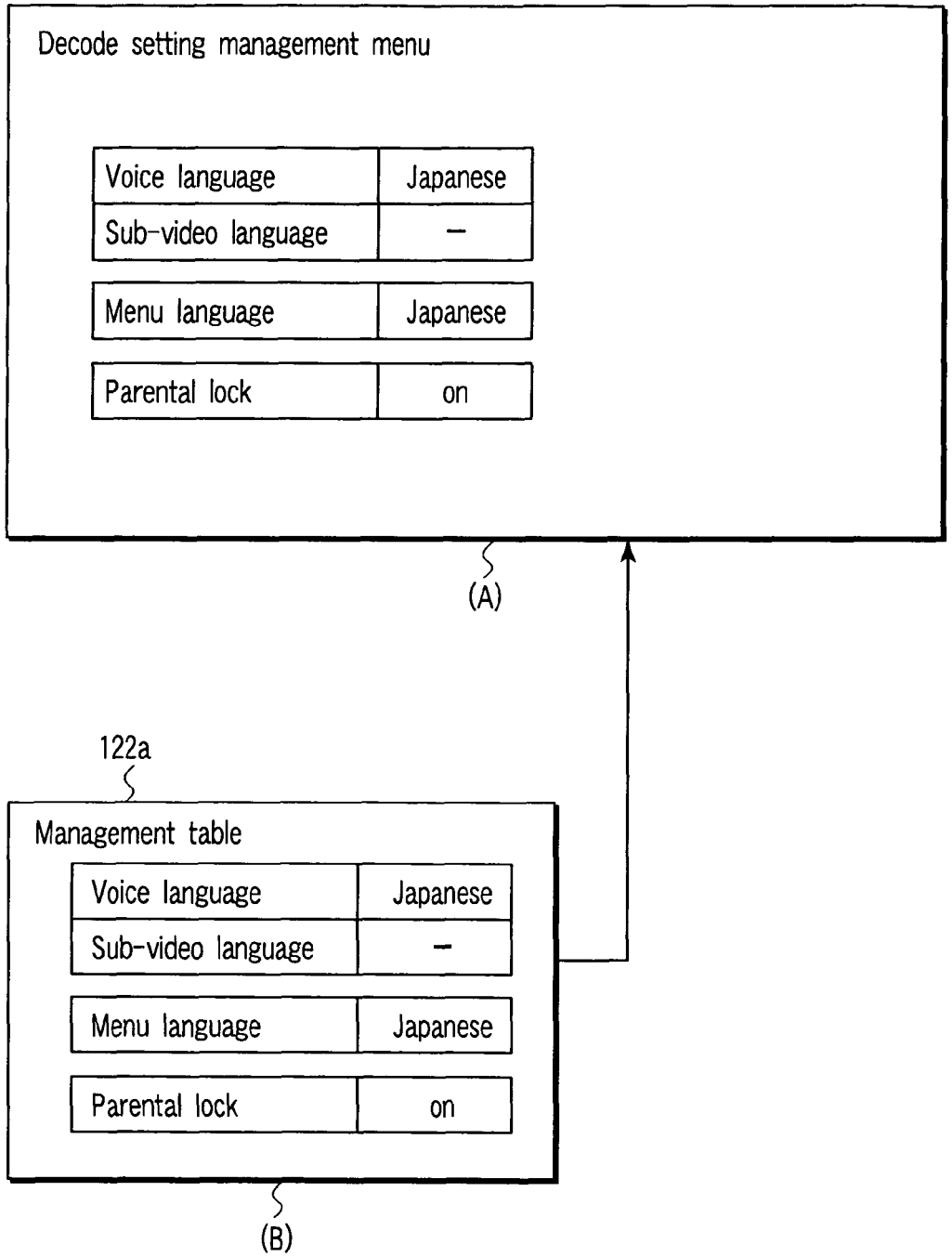
FIG. 5 is an explanatory diagram showing a display example of a management menu of a decode stream setting information management table.

FIG. 5 is an explanatory diagram showing a display example of a management menu for playback setting stored in the decode stream setting information management table 122a. The playback setting management menu (which is hereinafter referred to as a management menu) (A) shown in FIG. 5 is acquired by displaying decode stream setting information recorded in the decode stream setting information management table 122a (which is hereinafter referred to as a management table (B)) on the display section by use of the OSD processing section 121c. The management menu (A) displayed is so set as to permit a Japanese voice stream, no display of subtitles and Japanese menu information to be extracted from video information of the disk 1. Further, the parental lock is set on. Therefore, setting is made to skip playback of a chapter containing parental lock information.

In the above embodiment, a language stream desired by the user can be automatically selected and played back by causing the user to perform playback setting only once even when disks with plural types of formats are played back.

In this case, the parental lock is set in the on/off state, but when the level is set in the parental lock of video information, a level may be set in the parental lock of the management menu to switch the visible and audible limits in a stepwise fashion.

This invention is not limited to the above embodiment. For example, suppose that Japanese is set as a voice language of the management table 122a. In disks purchased in a foreign country, there are many cases wherein Japanese voice streams are not recorded. Therefore, it is considered that decode stream setting information will become ineffective. In order to solve the above problem, it is possible to store a plurality of playback settings and set the priority order of the settings.

Figure 6:
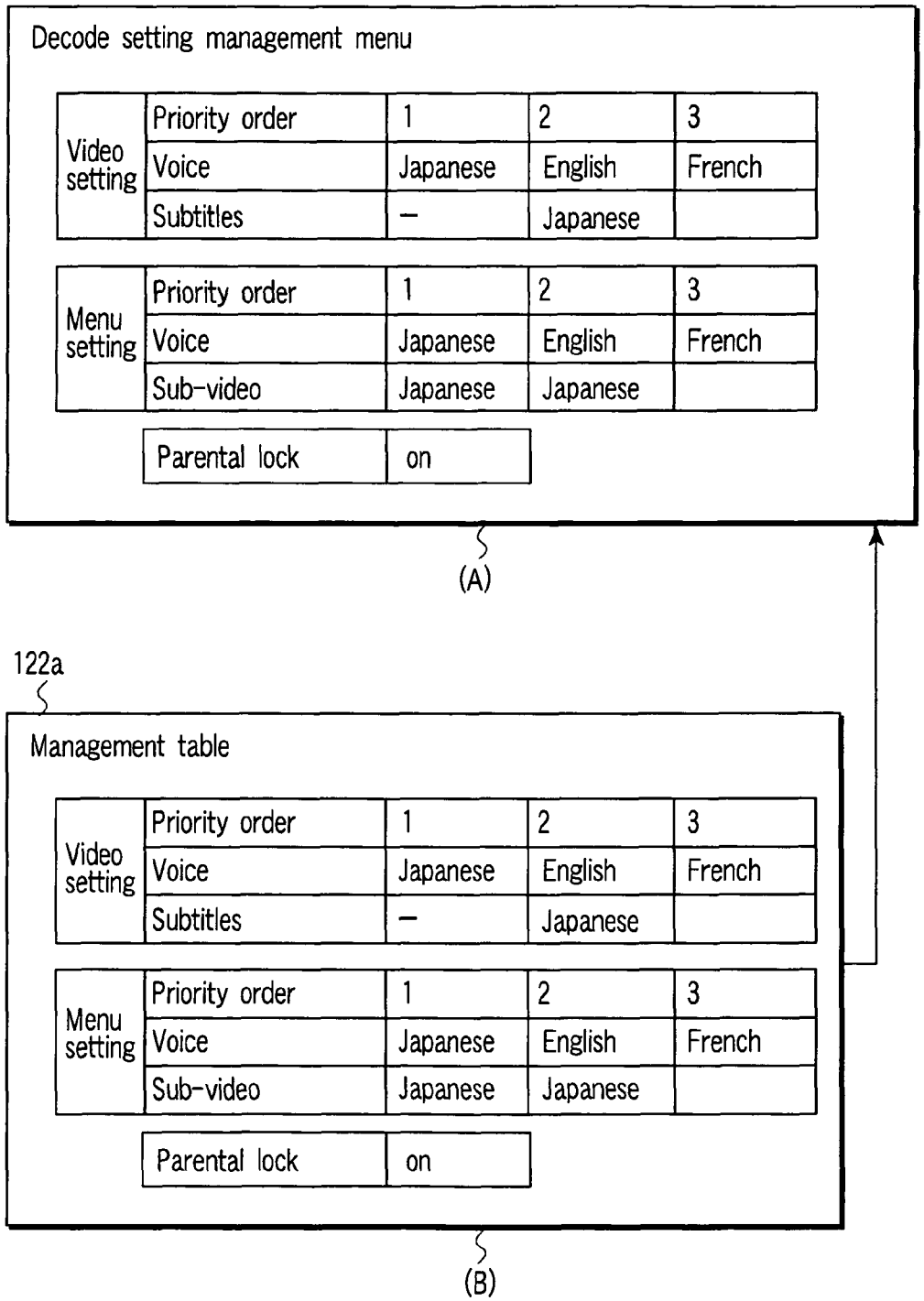
FIG. 6 is an explanatory diagram showing a display example of a management menu of a playback setting operation according to another embodiment.

FIG. 6 is an explanatory diagram showing a display example of the management menu (A) for playback setting according to another embodiment of this invention. In the management menu (A) shown in FIG. 6, it is indicated that the priority order is set for the playback settings. FIG. 6 shows a management table 122a in which a plurality of decode stream setting information items are recorded together with the priority orders. The plurality of playback settings are displayed as the management menu (A) on the display section by an OSD processing section 121c.

That is, the playback setting of the priority order 1 is so made as to permit a Japanese voice stream, no display of subtitles, voice stream of a Japanese menu and sub-video stream of the Japanese menu to be extracted. In this case, if a Japanese voice stream is not contained in the disk 1, setting information of the priority order 2 is used. The playback setting of the priority order 2 is so made as to permit an English voice stream, Japanese subtitle stream, voice stream of an English menu and sub-video stream of a Japanese menu to be extracted. The playback setting of the priority order 3 is so made as to permit a French voice stream and voice stream of a French menu to be extracted. In this example, since the subtitles and language of the sub-video information of a menu are set as non-setting, the language stream of the default of the disk 1 is set.

According to the above embodiment, even when a set language is not contained, a language stream similar to the desired language stream of the user can be automatically selected and played back. In the above explanation, stream setting information is displayed on a screen of the display device, but this is not limitative. For example, stream setting information may be displayed on the display section of the equipment main body.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A moving picture playback equipment comprising:
a drive section configured to include an optical pickup, the optical pickup being capable of selectively setting a first light source of a first wavelength and a second light source of a second wave length different from the first wavelength;
a media determining section configured to determine a disc type of a loaded disc picked up from a plurality of discs whose formats are different, and set the first or second light source at the drive section, when the loaded disc is accessed by the drive section, wherein one of the plurality of the discs is picked up using the first light source, and another one of the plurality of the discs is picked up using the second light source;
a separating section configured to separate and extract a desired menu stream and a video stream from a signal read out by the drive section;
a playback stream setting information management table provided in a memory section and configured to store setting information of a menu stream and a video stream to be played back, wherein the setting information is configured by information indicating at least one of voice and subtitle languages for the video stream;
a playback stream setting information management section configured to set languages of voice and subtitle of the video stream to be played back in reference to the setting information stored in the memory section, and configured to set at least a default language stream of voice or subtitle of the video stream to be played back, described in management information of the loaded disc, if the setting information of the voice and/or subtitle set by a user is not recorded in the loaded disc; and
an OSD processing section configured to output the setting information for display, wherein a status of the setting information can be confirmed.

2. The moving picture playback equipment of claim 1, wherein the setting information is configured by at least one of sets indicating information on voice and sub-video languages for the menu stream, wherein the information on one of voice and sub-video languages in the set is allowed not to be written.

3. The moving picture playback equipment of claim 2, wherein the setting information is further configured by parental lock information to be used for skipping a chapter.

4. A moving picture playback method of an equipment including, a drive section configured to include an optical pickup, the optical pickup being capable of selectively setting a first light source of a first wavelength and a second light source of a second wave length different from the first wavelength, a media determining section configured to determine a disc type of a loaded disc picked up from a plurality of discs whose formats are different, and set the first or second light source at the drive section, when the loaded disc is accessed by the drive section wherein one of the plurality of the discs is picked up using the first light source, and another one of the plurality of the discs is picked up using the second light source, a separating section configured to separate and extract a desired menu stream and a video stream read out by the drive section, the method comprising;

storing setting information of a menu stream and a video stream to be played back, wherein the setting information is configured by information indicating at least one of voice and subtitle languages for the video stream;

setting languages of voice and subtitle of the video stream to be played back in reference to the setting information stored in the memory section, and setting at least a default language stream of voice or subtitle of the video stream to be played back, described in management information of the loaded disc, if the setting information of the voice and/or subtitle set by a user is not recorded in the loaded disc; and outputting the setting information for display, wherein a status of the setting information can be confirmed.

5. The moving picture playback method of claim 4, wherein the setting information is configured by at least one of sets indicating information on voice and sub-video languages for the menu stream, wherein information on one of voice and sub-video languages is allowed not to be written.

6. The moving picture playback method of claim 5, wherein the setting information is further configured by parental lock information to be used for skipping a chapter.

* * * * *